(12) United States Patent
Clark et al.

(10) Patent No.: US 6,942,810 B2
(45) Date of Patent: Sep. 13, 2005

(54) METHOD FOR TREATING METAL-CONTAINING SOLUTIONS

(75) Inventors: James Robert Clark, Phoenix, AZ (US); Juzer Jangbarwala, Chino Hills, CA (US)

(73) Assignee: The BOC Group, Inc., Murray Hill, NJ (US)

( * ) Notice: Subject to any disclaimer, the term of this patent is extended or adjusted under 35 U.S.C. 154(b) by 57 days.

(21) Appl. No.: 10/749,946

(22) Filed: Dec. 31, 2003

(65) Prior Publication Data

US 2005/0139553 A1    Jun. 30, 2005

(51) Int. Cl.$^7$ .............................................. C02F 1/46
(52) U.S. Cl. ...................... 210/748; 210/912; 205/771
(58) Field of Search ................ 210/748, 912; 205/750, 771

(56) References Cited

U.S. PATENT DOCUMENTS

| | | | |
|---|---|---|---|
| 3,755,530 A | | 8/1973 | Avila et al. |
| 3,766,049 A | * | 10/1973 | Smith .......................... 204/634 |
| 4,416,745 A | | 11/1983 | Warren |
| 4,762,601 A | | 8/1988 | Krulik et al. |
| 4,909,913 A | * | 3/1990 | Fukuda et al. .............. 205/560 |
| 4,956,097 A | | 9/1990 | Courduvelis |
| 5,306,336 A | | 4/1994 | Martyak et al. |
| 5,419,821 A | | 5/1995 | Vaughan |
| 5,690,806 A | * | 11/1997 | Sunderland et al. ........ 205/560 |
| 5,730,856 A | | 3/1998 | Omasa |
| 6,162,333 A | | 12/2000 | Lemon et al. |
| 6,245,389 B1 | | 6/2001 | Horikawa et al. |
| 6,391,209 B1 | | 5/2002 | Belongia et al. |
| 2002/0153254 A1 | | 10/2002 | Belongia et al. |
| 2003/0150736 A1 | | 8/2003 | Kovarsky |

* cited by examiner

*Primary Examiner*—Betsey Morrison Hoey
(74) *Attorney, Agent, or Firm*—David A. Hey

(57) ABSTRACT

A method for treating an electroless plating liquid or other metal-containing solution that also contains reducing agents. The method includes providing a reaction vessel containing an anode, a cathode, and a hydrogen ion-permeable membrane separating the anode and the cathode, placing the metal-containing liquid in contact with the anode, placing a catholyte solution in contact with the cathode; driving an electrical current through the anode and the cathode to oxidize the reducing agents present, and removing the used catholyte solution and the partially treated liquid from the electrodes, optionally from the reaction vessel to separate reservoirs. The partially treated liquid and an anolyte solution are placed in contact with the cathode and anode, respectively, and a current is again driven through the anode and cathode, plating a majority of the metal ions onto the cathode. The steps of oxidizing the reducing agents and plating the metal ions may also be reversed in order.

18 Claims, 1 Drawing Sheet

METHOD FOR TREATING METAL-CONTAINING SOLUTIONS

FIELD OF THE INVENTION

The invention relates to a process and apparatus for treating metal-containing solutions by electrolysis. The process and apparatus provide the removal of metals from the solution to make the solution environmentally acceptable for disposal and to recover valuable metals from the solution.

BACKGROUND

Electroless plating is a commonly used method for introducing a metal coating onto an object. To coat an object by electroless plating, a metal compound is placed in solution and the elemental metal is subsequently deposited via a chemical reaction. Electroless plating may be used to provide a highly uniform coating of a metal such as nickel, copper, silver, gold, platinum, or palladium on an item. Electroless plating is frequently used in the electronics industry, for example, in the processing of semiconductor wafers.

With time and use, an electroless plating solution will become exhausted and/or contaminated with by-products of the plating process, necessitating its replacement. Spent plating solutions, however, contain metal compounds, with their environmental considerations. Spent plating solutions can also tend to evolve a significant amount of hydrogen gas, presenting an explosion and fire hazard. As a result, a variety of methods have been devised to treat spent plating solutions.

U.S. Pat. No. 6,391,209, the disclosure of which is incorporated herein by reference, describes a number of prior methods for the treatment of spent plating solutions. These include treatment of the solution with an oxidizing agent such as hydrogen peroxide. Another method includes the chemical reduction of the metal and subsequent precipitation of organic complexing agents. Plating solutions may also be treated by exposure to ozone, ultraviolet light, or hydrogen peroxide, or a combination thereof.

U.S. Pat. No. 5,730,856, the disclosure of which is also incorporated herein by reference, describes a method for treating electroless plating solutions by electrolytic oxidation and simultaneous vibration and fluidization by an oscillating stirrer.

Electrochemical cells have also been used to remove metals from metal containing solutions such as electroless plating solutions. U.S. Pat. No. 6,162,333 to Lemon et al., the disclosure of which is incorporated herein by reference, describes such a cell.

SUMMARY

A method is provided for treating a metal-containing liquid, wherein the metal-containing liquid also comprises reducing agents, the method comprising:
  providing a reaction vessel containing an anode, a cathode, and a hydrogen ion-permeable membrane separating the anode and the cathode;
  disposing the metal-containing liquid to be treated in the reaction vessel in contact with the anode;
  disposing a catholyte solution in contact with the cathode;
  a first placing of the anode and cathode in electrical communication with a power source and driving an electrical current through the anode and the cathode until at least a majority of the reducing agents in the metal-containing liquid are oxidized to create an intermediate liquid and a used catholyte solution;
  removing the used catholyte solution from contact with the cathode and the intermediate liquid from contact with the anode, optionally from the reaction vessel separately to a first and a second reservoir respectively;
  disposing the intermediate liquid in contact with the cathode;
  disposing an anolyte solution in contact with the anode; and
  a second placing of the anode and cathode in electrical communication with a power source and driving an electrical current through the anode and the cathode until a majority of the metal ions in the intermediate liquid are plated onto the cathode to provide a treated solution.

The order of steps of the treatment method may also be altered such that the method comprises:
  providing a reaction vessel containing an anode, a cathode, and a hydrogen ion-permeable membrane separating the anode and the cathode;
  disposing the metal-containing liquid in the reaction vessel in contact with the cathode;
  disposing an anolyte solution in the reaction vessel in contact with the anode;
  placing the anode and cathode in electrical communication with a power source and driving an electrical current through the anode and the cathode until at least a majority of the metal ions in the metal-containing liquid are plated onto the cathode to produce an intermediate liquid;
  removing the intermediate liquid from contact with the cathode and the anolyte solution from contact with the anode, optionally from the reaction vessel separately to a first and a second reservoir respectively;
  disposing the intermediate liquid in contact with the anode;
  disposing a catholyte solution in contact with the cathode; and
  a second placing the anode and cathode in electrical communication with a power source and driving an electrical current through the anode and the cathode until at least a majority of the reducing agents in the metal-containing liquid are oxidized to provide a treated solution. A used catholyte solution is also provided.

In the method, the catholyte may be a ferric salt solution, in one embodiment a ferric sulfate solution, and in one embodiment the anolyte may be a sodium sulfate solution. The catholyte and the anolyte may have an approximately equal ionic concentration as the corresponding liquid to be treated in the reaction vessel.

DETAILED DESCRIPTION

Figure 1:
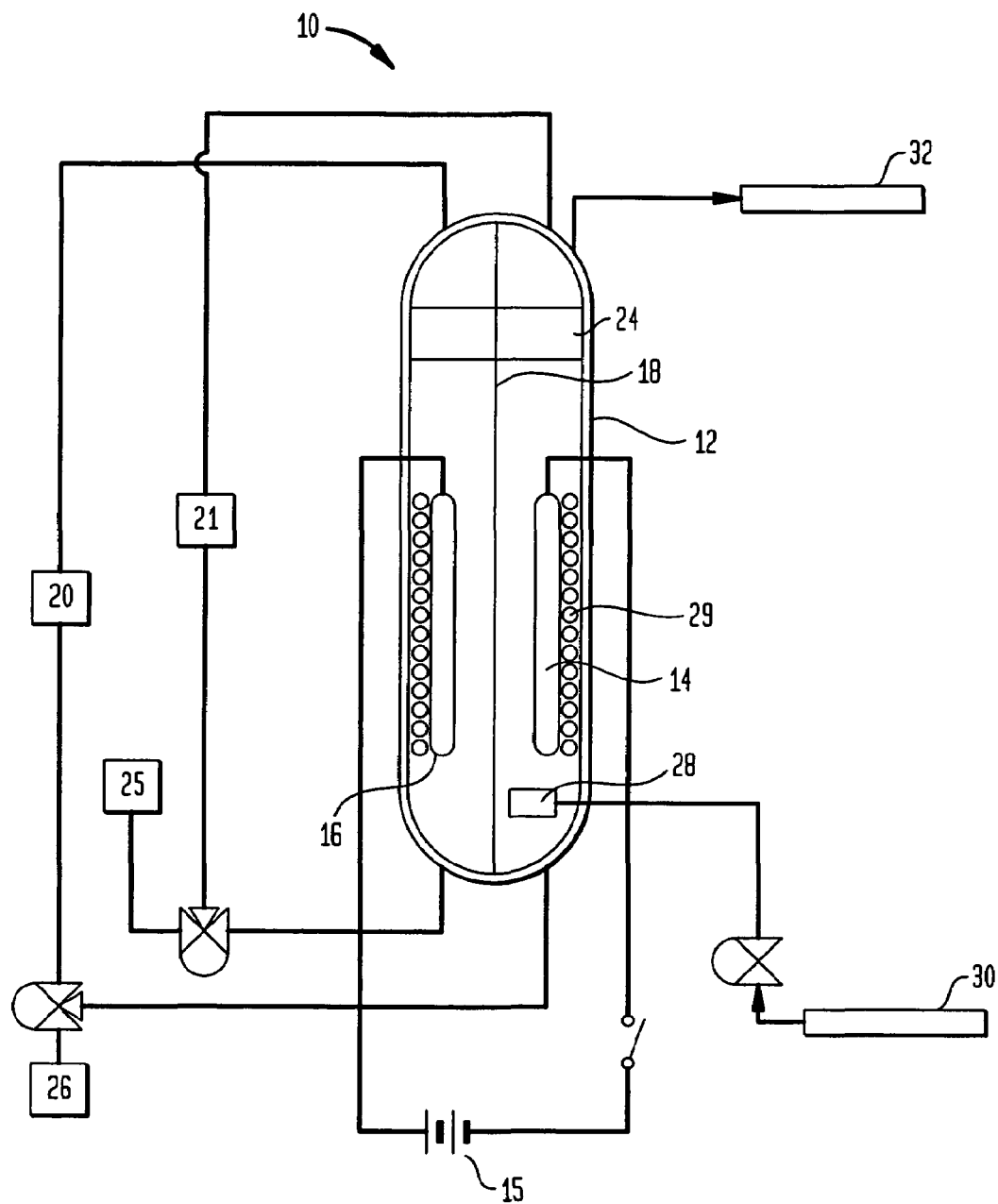
FIG. 1 is a schematic view of an apparatus for treating an electroless plating liquid.

One embodiment of an apparatus for treating a metal-containing liquid may be described with reference to FIG. 1. A treatment apparatus 10 comprises a reaction vessel 12. In the interior of reaction vessel 12 is a anode 14 and an cathode 16. The anode may be any metal that is not oxidized in the process such as stainless steel, and the cathode may be brass. Anode 14 and cathode 16 are in electrical communication with a power source 15, which in certain embodiments may be a direct current power source. Also contained within reaction vessel 12 is a hydrogen ion-permeable membrane 18, separating and providing two distinct volumes within reaction vessel 12 containing the anode 14 and cathode 16 respectively.

An electroless plating solution or similar metal-containing liquid is disposed in reaction vessel 12, contacting anode 14. A catholyte solution is placed in reaction vessel 12, contacting cathode 16. The catholyte solution preferably has approximately the same ionic concentration as the metal-containing liquid. The catholyte solution may be a solution of any non-electrochemically reactive salt. The non-electrochemically reactive salt may be a ferric salt, such as ferric sulfate. By "non-electrochemically reactive" is meant that neither the cation or anion component of the salt will react under the process conditions to produce a side reaction. For example, a salt that generates chloride ions would not be considered non-electrochemically reactive because the chloride ions would be oxidized under reaction conditions to form chlorine gas.

Anode 14 and cathode 16, placed in electrical communication with a power source 15, are driven by an electrical current. In one particular embodiment, the current applied is between about 1 and about 10 amperes, although other current levels may also be used. Electrolysis proceeds until at least a majority of the reducing agents in the metal-containing solution are oxidized at anode 14. This oxidation prevents the generation of hydrogen gas by the reducing agents. Simultaneously, ions in the catholyte solution are reduced. In the case of a ferric sulfate solution, ferrous sulfate forms.

Preferably, electrolysis is continued until substantially all of the reducing agents are oxidized. Progress of the reaction may be monitored by oxidation-reduction potential (ORP), colorimetry (if one of the species absorbs visible or ultraviolet light), or other known methods. The treatment may continue for a sufficient time and under sufficient current to oxidize all of the reducing agents according to stoichiometric calculations. For example, if the concentration of a reducing agent is 1 g/liter, and the reducing agent has a molar mass of 58 g/mol and gives up 6 electrons per molecule in the reduction process, complete electrolysis would take 33 minutes at an applied current of 5 amps (assuming 100% current efficiency):

$$1 \text{ g} \div (58 \text{ g/mole}) \times (6 \text{ mole e}^-/\text{mole}) \times (96{,}500 \text{ coulombs/mole e}^-) \div (5 \text{ coulomb/sec}) \div (60 \text{ sec/min}) = 33 \text{ min.}$$

The intermediate solution, i.e. the metal-containing solution that now has at least a majority of the reducing agents oxidized, is removed from contact with the anode. In certain embodiments, it is removed from the reaction vessel 12 to a first reservoir 20, while the used catholyte solution is removed from contact with the cathode, in certain embodiments, to a second reservoir 21. The intermediate solution is then placed in contact with cathode 16, if necessary being disposed back into the reaction vessel 12. An anolyte solution is then placed in contact with anode 14 in reaction vessel 12.

The anolyte solution preferably has approximately the same ionic concentration as the intermediate solution. The anolyte solution is a non-electrochemically reactive salt solution and may be a sodium salt such as sodium sulfate, but may also be a sulfate such as ferrous sulfate. Anode 14 and cathode 16 are placed in communication with power source 15 and are again driven by an electrical current. Typically, in certain embodiments, the current applied is between about 1 and about 10 amperes, although other current levels may also be used. Electrolysis proceeds until at least a majority of the oxidizing agents (i.e., the metal ions) in the intermediate solution are plated onto cathode 16 as the elemental metal. Hydrogen gas may evolve from anode 14 as a result of hydrolysis of water.

Preferably, substantially all of the metal ions are plated onto cathode 16. Progress of the reaction may be monitored by ORP, colorimetry, or other known methods, or treatment may continue for a sufficient time and under sufficient current to oxidize all of the reducing agents according to stoichiometric calculations, as mentioned above.

At the conclusion of the second electrolysis step, the treated liquid in contact with the cathode (from which the metal compounds and reducing agents have been removed) is drained into a container 25 for storage or disposal. Used anolyte may also be removed to a separate reservoir 26 for storage or disposal. The process results in a waste plating solution in which the reducing agents have been oxidized and thus can not subsequently produce $H_2$ gas, and from which the plating metallic ions have been removed. Additionally, when a ferrous sulfate solution from the first electrolysis step is stored in reservoir 21, ferric sulfate can be regenerated by bubbling air or oxygen through the ferrous sulfate solution.

The process may be operated in reverse order, i.e. removal of oxidizing agents first, then oxidation of reducing agents. In such an example, the electroless plating solution or similar metal-containing liquid is disposed in reaction vessel 12, contacting cathode 16. An anolyte solution is placed in reaction vessel 12, contacting anode 14. The anolyte solution preferably has approximately the same ionic concentration as the metal-containing liquid. The anolyte solution may be any non-electrochemically reactive salt solution. For example, the anolyte may be a sodium salt such as sodium sulfate, but may also be a sulfate such as ferrous sulfate. Anode 14 and cathode 16 are placed in electrical communication with a power source 15, which is preferably a direct current power source. Electrolysis proceeds until at least a majority of the oxidizing agents (i.e., the metal ions) in the metal-containing liquid are plated onto cathode 16 as the elemental metal. Hydrogen gas may evolve from anode 14 as a result of hydrolysis of water. Preferably, substantially all of the metal ions are plated onto the cathode. Progress of the reaction may be monitored by ORP, colorimetry, or other methods, or treatment may continue for a sufficient time and under sufficient current to oxidize all of the reducing agents according to stoichiometric calculations, as mentioned previously.

The intermediate solution, i.e. the plating solution that now has at least a majority of the metal ions removed, is then removed from contact with the cathode. In certain embodiments, it is removed from the reaction vessel 12 to a reservoir 21, while the used anolyte solution is removed from contact with the anode, in certain embodiments, to reservoir 26. The intermediate solution is then placed in contact with anode 14, if necessary, being placed back into reaction vessel 12. A catholyte solution is then placed in contact with cathode 16 in reaction vessel 12. The catholyte solution may be any non-electrochemically reactive salt solution. Suitable solutions include solutions of a ferric salt such as ferric sulfate, and sodium sulfate solutions.

The catholyte solution preferably has approximately the same ionic concentration as the intermediate solution. Anode 14 and cathode 16 are again driven by an electrical current in electrical communication with power source 15. As mentioned above, in certain embodiments the current will typically be between about 1 and about 10 amperes, although other current levels may also be used. Electrolysis proceeds until at least a majority of the reducing agents in the intermediate solution are oxidized at anode 14. Preferably, substantially all of the reducing agents are oxidized. This oxidation prevents the generation of hydrogen gas by the reducing agents. Simultaneously, ions in the catholyte solution are reduced. In the case of a ferric sulfate solution, ferrous sulfate forms. Progress of the reaction may be monitored by ORP, colorimetry, or other methods, or treatment may continue for a sufficient time and under sufficient current to oxidize all of the reducing agents according to stoichiometric calculations, as mentioned above.

At the conclusion of the second electrolysis step, the treated liquid in contact with the anode (from which the metal compounds and reducing agents have been removed) is drained into a container 26 for storage or disposal. Used catholyte may also be removed to a separate reservoir 25 for storage, recycling or disposal. When a ferrous sulfate solution is stored in reservoir 25, ferric sulfate can be regenerated by bubbling air or oxygen through the ferrous sulfate solution. The process results in a waste plating solution in which the reducing agents have been oxidized and thus can not subsequently produce $H_2$ gas, and from which the plating metallic ions have been removed.

Reaction vessel 12 may additionally include a sparger 28 in fluid communication with a source of inert gas 30. The inert gas may be, for example, nitrogen or a noble gas such as helium or argon. Reaction vessel 12 may also include a vapor trap 24 and a heat exchanger 29 such as a cooling jacket or coiled tube through which cooled water is circulated. A vent 32 may also be present. Vent 32 is preferably in fluid communication with a hydrogen gas scrubber (not shown).

During treatment of the plating liquid, the liquid may be sparged with an inert gas such as nitrogen, helium or argon. Hydrogen gas that is released during the treatment of the plating liquid, is then swept away with the inert gas to create a sparge gas. Residual amounts of liquid carried with the sparge gas is removed by vapor trap 24. The at least partially dried sparge gas is then vented through vent 32, preferably to a hydrogen gas scrubber (not shown).

Heat may also be generated during treatment which is removed by heat exchanger 29. The temperature of the plating liquid may be maintained at a temperature suitable for discharge or further treatment. For example, the plating liquid may be maintained at about 50° C. or less during treatment. The liquid may be further treated, for example, by contacting it with an ion exchange resin.

EXAMPLE

The following example is set forth to further illustrate an embodiment of the process. The example should not be construed as limiting the process in any manner.

A used electroless plating solution containing cobalt ions as the oxidizing agent and dimethylamineborane (DMAB) as the reducing agent may be treated to prevent plate out and spontaneous production of hydrogen gas as follows.

First step: A used electroless plating solution is placed in contact with the anode as described above (i.e. acts as anolyte). The catholyte is an aqueous ferric sulfate solution. Upon application of electric current, the oxidation reaction at the anode is: $DMAB \rightarrow DMA + B(OH)_3 + 6e^-$; the reduction reaction at the cathode is: $Fe^{+3} + e^- \rightarrow Fe^{+2}$. The anolyte and catholyte are then removed from the apparatus.

Second step: The used electroless plating solution from the above-mentioned first step (i.e. the solution in which the DMAB was just oxidized) is placed in contact with the cathode (i.e. acts as catholyte). The anolyte is an aqueous solution containing sodium sulfate. Upon application of electric current, the reduction reaction at the cathode is: $Co^{+2} + 2e^- \rightarrow Co$; the oxidation reaction at the anode is: $2H_2O \rightarrow 4H^+ + O_2 + 4e^-$.

The result is a used electroless plating solution from which the cobalt ions have been removed and in which the DMAB has been oxidized, so that the solution will not plate out and will not spontaneously produce hydrogen gas.

The present apparatus and process are advantageous over prior systems because they provide for the removal of metals and metal compounds from a plating liquid rapidly and economically with a minimum generation of hydrogen gas; they also provide for the separate oxidation of the reducing agent at the anode and reduction of the oxidizing agent at the cathode, and thus prevent the reducing agent and the oxidizing agent from reacting directly with each other in the bulk solution, which reaction would proceed uncontrollably and generate hydrogen gas.

The entire process may be controlled by a programmable controller, and data recorded from the process can be sent to a computer which can be used to retrieve the data remotely. The apparatus and process may include a fully automated microprocessor controller which continuously monitors system operation providing fault detection, pressure and/or temperature control and valve sequencing, ensuring reliability, while minimizing operator involvement.

The apparatus may include system alarms to detect potential hazards, such as temperature or pressure excursions, to ensure system integrity. Alarm and warning conditions may be indicated at the operator interface and may be accompanied by an alarm beeper.

It will be understood that embodiments(s) described herein is/are merely exemplary, and that one skilled in the art may make variations and modifications without departing from the spirit and scope of the invention. All such variations and modifications are intended to be included within the scope of the invention as described hereinabove. It should be understood that any embodiments described hereinabove are only in the alternative, but can be combined.

We claim:

1. A method for treating a metal-containing liquid, wherein the metal-containing liquid also comprises reducing agents, the method comprising:

providing a reaction vessel containing an anode, a cathode, and a hydrogen ion-permeable membrane separating the anode and the cathode;

disposing the metal-containing liquid to be treated in the reaction vessel in contact with the anode;

disposing a catholyte solution in contact with the cathode;

a first placing of the anode and cathode in electrical communication with a power source and driving an electrical current through the anode and the cathode until at least a majority of the reducing agents in the metal-containing liquid are oxidized to create an intermediate liquid and a used catholyte solution;

removing the used catholyte solution from contact with the cathode and the intermediate liquid from contact with the anode, optionally from the reaction vessel separately to a first and a second reservoir respectively;

disposing the intermediate liquid in contact with the cathode;

disposing an anolyte solution in contact with the anode; and a second placing of the anode and cathode in electrical communication with a power source and driving an electrical current through the anode and the cathode until a majority of the metal ions in the intermediate liquid are plated onto the cathode to provide a treated solution.

2. The method of claim 1, wherein the catholyte solution is a solution of a non-electrochemically reactive salt, having an approximately equivalent ionic concentration as the metal-containing liquid.

3. The method of claim 2, wherein the catholyte solution is a ferric sulfate solution and the used catholyte solution is a ferrous sulfate solution.

4. The method of claim 3, additionally comprising regenerating a ferric sulfate solution from the ferrous sulfate solution by bubbling a gas through the ferrous sulfate solution, wherein the gas is selected from the group consisting of air and oxygen.

5. The method of claim 3, wherein the anolyte solution is a solution of approximately equal ionic concentration as the intermediate liquid, selected from the group consisting of sodium salt solutions and sulfate salt solutions.

6. The method of claim 5, wherein the anolyte solution is selected from the group consisting of sodium sulfate and ferrous sulfate.

7. The method of claim 1, wherein the anolyte solution is a solution of approximately equal ionic concentration as the intermediate liquid, selected from the group consisting of sodium salt solutions and sulfate salt solutions.

8. The method of claim 7, wherein the anolyte solution is selected from the group consisting of sodium sulfate and ferrous sulfate.

9. The method of claim 1, wherein the electrical current in at least one of the first and second placing of the anode and cathode in electrical communication with a power source is between about 1 ampere and about 10 amperes.

10. A method for treating a metal-containing liquid, wherein the metal-containing liquid also comprises reducing agents, the method comprising:
  providing a reaction vessel containing an anode, a cathode, and a hydrogen ion-permeable membrane separating the anode and the cathode;
  disposing the metal-containing liquid in the reaction vessel in contact with the cathode;
  disposing an anolyte solution in the reaction vessel in contact with the anode;
  placing the anode and cathode in electrical communication with a power source and driving an electrical current through the anode and the cathode until at least a majority of the metal ions in the metal-containing liquid are plated onto the cathode to produce an intermediate liquid;
  removing the intermediate liquid from contact with the cathode and the anolyte solution from contact with the anode, optionally from the reaction vessel separately to a first and a second reservoir respectively;
  disposing the intermediate liquid in contact with the anode;
  disposing a catholyte solution in contact with the cathode; and
  a second placing the anode and cathode in electrical communication with a power source and driving an electrical current through the anode and the cathode until at least a majority of the reducing agents in the metal-containing liquid are oxidized to provide a treated solution.

11. The method of claim 10, wherein the catholyte solution is a solution of a ferric salt, having an approximately equivalent ionic concentration as the intermediate liquid.

12. The method of claim 11, wherein the ferric salt is ferric sulfate and the used catholyte solution is a ferrous sulfate solution.

13. The method of claim 12, additionally comprising regenerating a ferric sulfate solution from the ferrous sulfate solution by bubbling a gas through the ferrous sulfate solution, wherein the gas is selected from the group consisting of air and oxygen.

14. The method of claim 12, wherein the anolyte solution is a solution of approximately equal ionic concentration as the intermediate liquid, selected from the group consisting of sodium salt solutions and sulfate salt solutions.

15. The method of claim 14, wherein the anolyte solution is selected from the group consisting of sodium sulfate and ferrous sulfate.

16. The method of claim 10, wherein the anolyte solution is a solution of approximately equal ionic concentration as the intermediate liquid, selected from the group consisting of sodium salt solutions and sulfate salt solutions.

17. The method of claim 16, wherein the anolyte solution is selected from the group consisting of sodium sulfate and ferrous sulfate.

18. The method of claim 8, wherein the electrical current in at least one of the first and second placing of the anode and cathode in electrical communication with a power source is between about 1 ampere and about 10 amperes.

* * * * *